United States Patent [19]

Gray et al.

[11] 4,074,733
[45] Feb. 21, 1978

[54] FLEXIBLE LEAD CHLORIDE CATHODE CONSTRUCTION

[75] Inventors: Thomas J. Gray, Armdale; Jan Wojtowicz, Dartmouth, both of Canada

[73] Assignee: The Minister of National Defence of Her Majesty's Canadian Government, Ottawa, Canada

[21] Appl. No.: 693,835

[22] Filed: June 8, 1976

[30] Foreign Application Priority Data

June 16, 1975 Canada .................................. 229399

[51] Int. Cl.$^2$ ............................................. H01M 7/00
[52] U.S. Cl. ........................................ 141/32; 118/423; 118/428; 118/429
[58] Field of Search ........................... 141/1.1, 32, 33; 118/419, 423, 428, 429, 422, 117, 60; 29/623.5; 429/225

[56] References Cited

U.S. PATENT DOCUMENTS 3,779,056  12/1973  Padjen et al. .................... 118/429

Primary Examiner—Houston S. Bell
Attorney, Agent, or Firm—Stevens, Davis, Miller & Mosher

[57] ABSTRACT

Flexible electrode material for use in salt water batteries, and a method of and apparatus for the continuous manufacture of such material, are disclosed. The material is manufactured by guiding a strip-shaped mesh, e.g., a copper wire gauze, from a supply position through a bath of molten coating material, e.g. lead chloride, and vertically upwardly from the bath to cause the coating material to become deposited on the mesh, which is subsequently cooled. For guiding the mesh, the apparatus employs first guide rollers for guiding the mesh on a path of travel extending downwardly from the first guide rollers to a second guide roller, made of graphite, immersed in the bath, and third guide means for guiding the mesh upwardly from the graphite roller. Hydraulic jacks are provided for raising and lowering the bath to and from an elevated position in which the graphite roller is immersed in the bath.

6 Claims, 1 Drawing Figure

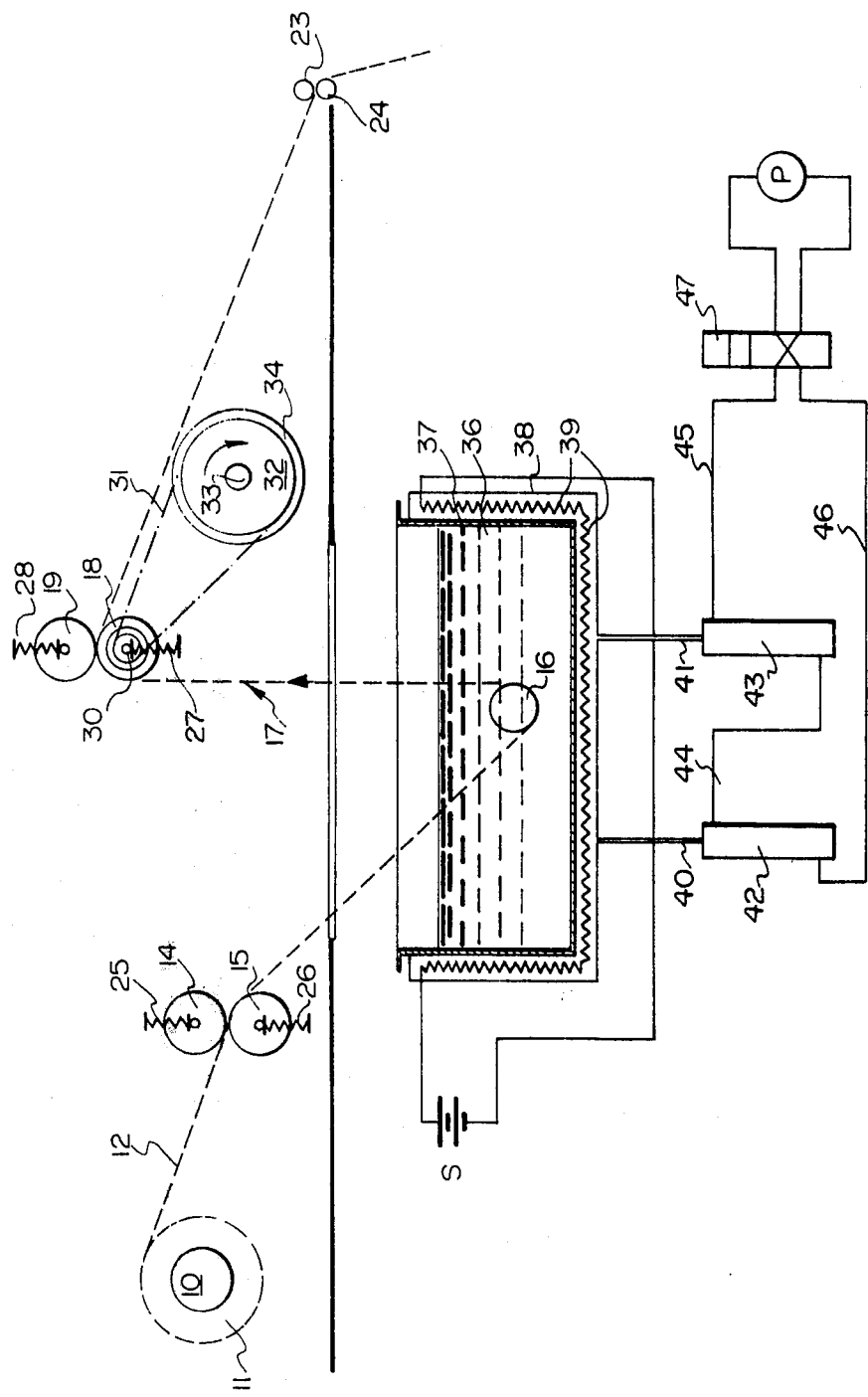

FLEXIBLE LEAD CHLORIDE CATHODE CONSTRUCTION

The present invention relates to flexible electrode material, suitable, for example, for use in the manufacture of salt water batteries, and to methods of an apparatus for the continuous manufacture of electrode material.

Electrodes are conventionally manufactured by mixing lead chloride powder with a binder and with carbon or other electrically conductive material, and then compacting the mixture around both sides of a metallic conductor, e.g. copper or nickel gauze, perforated sheet or expanded metal.

However, the necessity to include conducting material and a binder in the mixture reduces the amount of active material which can be included in the electrode, and therefore reduces the electrical efficiency of the electrode.

Furthermore, this prior, conventional process for the manufacture of battery electrodes requires considerably expenditure of labour and may involve difficulties in quality control.

In U.S. Pat. No. 4,016,339 there is disclosed a method of forming a battery electrode structure which comprises placing an open-mesh electrically conductive support structure in the form of a copper wire screen in a mold, and casting a mass of electrically active material in the mold around the support structure, the electrically active material comprising, for example, lead chloride.

It is an object of the present invention to provide a novel and improved method and apparatus for manufacturing flexible electrode material by a continuous process.

According to the present invention, there is provided a method for the continuous manufacture of flexible electrode material which comprises the steps of: providing a bath of molten electrode coating material, guiding a strip-shaped mesh from a supply position, through the bath and upwardly from the bath to cause the coating material to become deposited on the mesh; and cooling the coating material deposited on the mesh after the mesh has passed through the bath.

Preferably, the mesh comprises woven wire gauze, perforated sheet metal or expanded sheet metal, made of copper, and the coating material comprises lead chloride.

In a preferred embodiment of the invention, the strip-shaped mesh is withdrawn from the bath in a vertical direction along a vertical guide path, the length of which may be adjusted to control downward flow of the deposited coating material as the gauze passes upwardly along the vertical path.

The mesh may conveniently be guided around the underside of a guide member, e.g. a graphite roller, within the bath.

One advantageous method of achieving this is by firstly guiding the mesh around the underside of the guide member with the bath disposed at a distance below the guide member, and then raising the bath until the guide member becomes immersed in the molten coating material contained within the bath.

When the coating material has been cooled sufficiently to effect solidification thereof, the electrode material may be cut into predetermined lengths, or coiled, e.g. on a spool, as desired.

The present invention further provides apparatus for the manufacture of flexible electrode material, which comprises an open-topped container for a bath of molten coating material, means for heating and melting the coating material in the container, first guide means for guiding a strip-shaped mesh on a path of travel extending downwardly from the first guide means, second guide means for guiding the mesh beneath the surface of the molten coating material, third guide means for guiding the mesh upwardly from said second guide means, means for raising and lowering the container to and from an elevated position in which the second guide means is immersed in the bath; and drive means for advancing the mesh past the first, second and third guide means.

Preferably, the third guide means are positioned to guide the mesh along a vertical path from the second guide means, and are adjustable for varying the height of the third guide means above the bath.

The first and third guide means may comprise resiliently mounted rollers, which are adjustable for varying the tension in the mesh.

The invention will be more readily understood from the following description of a preferred embodiment thereof given, by way of example, with reference to the accompanying drawing, which shows a diagrammatic side view of apparatus for forming flexible lead chloride electrode material.

The apparatus illustrated in the drawing has a supply spool 10 for carrying a coil 11 of strip-shaped mesh material, which is preferably in the form of a woven copper wire gauze 12.

The woven wire copper gauze 12 extends from the supply coil 11 on the spool 10 through the nip between a pair of rollers 14 and 15 and around the underside of a freely-rotatable graphite roller 16.

From the graphite roller 16, the mesh 12 passes vertically upwardly, along a vertical path indicated generally by reference numeral 17 to a lower, driven roller 18, which is one of a pair of rollers 18 and 19.

From the driven roller 18, the mesh 12 passes, at a downward inclination, to the nip between a pair of guide rollers 23 and 24.

The guide rollers 14 and 15 are urged resiliently against opposite sides of the mesh 12 by respective springs 25 and 26, and the rollers 18 and 19 are similarly urged resiliently against the opposite sides of the mesh 12 by springs 27 and 28.

The drive roller 18 is secured for rotation with a sprocket 30, which is driven by a drive chain 31 from a sprocket 32 keyed to the shaft 33 of a variable speed electric motor 34. By this means, the electric motor 34 can be employed to rotate the drive roller 18 at a variable speed, thereby controlling the speed of advance of the gauze 12 through the apparatus.

The freely rotatable graphite roller 16 is immersed in a bath 36 of molten lead chloride, which is contained in an open-topped tank 37.

The open-topped tank 37 is provided with a heat-insulating jacket 38 containing electrical resistance heating elements 39, which are energized from an electric power source S.

The open-topped tank 37 is vertically-displaceably mounted on hydraulic rams 40 and 41, which are connected in series in an hydraulic circuit so as to be simultaneously extensible and simultaneously retractable.

More particularly, the hydraulic rams 40 and 41 have cylinders 42 and 43, opposite ends of which are connected by a hydraulic fluid line 44.

The other ends of the hydraulic cylinders 42 and 43 are connected by respective hydraulic fluid lines 45 and 46 to a slide valve 47, which is adjustable for alternately connecting the hydraulic fluid lines 45 and 46 to the outlet and the inlet of a source P of hydraulic fluid under pressure.

In operation of the above-described apparatus, the open-topped tank 37 is lowered from the elevated position in which it is shown in the drawing to enable the mesh to be guided round the underside of the freely rotatable graphite roller 16 and past the remaining rollers, as described above.

The electric resistance heating elements 39 are energized to heat the lead chloride 36 until the latter becomes molten.

The open-topped tank 37 is then raised, by actuation of the hydraulic rams 40 and 41, to its elevated position, so that the freely rotatable graphite roller 16 becomes immersed in the bath of molten lead chloride 36.

The energization of the electric resistance heater elements 39 is controlled to maintain the temperature of the molten lead chloride 36 within the range 510° C to 600° C, the fusion point for lead chloride being 501° C.

The rollers 18 and 19 are adjustable in height, above the level of the surface of the molten lead chloride 36, to facilitate control of lead chloride run-back from the coated gauze as the gauze 12 travels upwardly along the vertical path 17.

As will readily be appreciated, the speed at which the gauze passes through the machine is controlled both by the sizes of the sprocket gears 30 and 32, and by the speed of the electric motor 34.

Inlet and exhaust fans (not shown) are provided for effecting cooling of the coated mesh or gauze 12, after the latter has passed between the rollers 18 and 19, and also to extract any toxic lead chloride arising from surface oxidation of the bath, the fumes being directed to a water-spray scrubbing unit (not shown) before being exhausted to the atmosphere.

The collection of the fumes is facilitated by the provision of a counterweighted hinged hood (not shown) extending over the apparatus.

To increase the amount of lead chloride deposited on the mesh 12, the speed of travel of the mesh 12, and thus the speed of rotation of the electric motor 34, are increased.

In addition, the size of the copper gauze, when employed as the mesh, also is an important factor in determining the amount of lead chloride which will be deposited. Gauzes having a greater roughness will be capable of picking up a heavier loading of lead chloride. For very heavy chloride coatings, it may be necessary to use expanded or perforated sheet metal substrates as the mesh, instead of woven wire gauze. However, the less expensive gauze is preferred when it is required to minimize the cost of production.

Successful results have been obtained, for example, using copper gauze of 32 mesh size, made from wire of 0.007 inch diameter. The width of this gauze was 2 inches, and the processing speed was in the range 2.4 feet/minute to 51.5 feet/minute, the molten lead chloride bath temperature being held at about 540° C. Electrodes obtained by this process were flexible and could readily be rolled into a cylindrical diameter as small as 1 centimeter. The lead chloride coating adhered very well to the gauze, although if the electrode material is intentionally flexed in a repeated back and forth manner, it was found that the coating could eventually be loosened.

Using a mesh speed of approximately 30 feet/minute, electrode materials were obtained having a loading of 0.08 grams of lead chloride per square centimeter, and increasing the speed to approximately 60 feet/minute gave a coating of lead chloride of 0.16 grams/centimeter$^2$.

The flexible electrode material obtained as described above was examined to determine its suitability for use in sea water batteries for sonobuoys, and electrodes containing a coating of 0.075 gm/cm$^2$ were found to be capable of discharge for about one hour under conditions appropriate to sonobuoy battery applications. More heavily coated electrodes (i.e., 0.4 gm/cm$^2$) discharged for more than 6 hours.

While lead chloride has been referred to as the coating material employed in the illustrated apparatus, it will be appreciated by those skilled in the art that other coating material, such as copper chloride, silver chloride or a mixture thereof, which melts without decomposition and which has a melting point lower than that of the metal of the mesh, usually copper, may be employed.

The embodiments of the invention in which an exclusive property of privilege is claimed are defined as follows:

1. Apparatus for the manufacture of flexible electrode material, which comprises:
    a container for a bath of molten coating material;
    means for heating and melting the coating material in the container;
    first guide means for guiding a strip-shaped mesh on a path of travel extending downwardly from the first guide means;
    second guide means for guiding the mesh beneath the surface of the bath;
    third guide means for guiding the mesh upwardly from the second guide means and out of the bath;
    means for raising and lowering the container to and from an elevated position in which the second guide means is immersed in the bath; and
    drive means for advancing the mesh past the first, second and third guide means.

2. Apparatus as claimed in claim 1, wherein the drive means comprise a variable speed drive means.

3. Apparatus as claimed in claim 1, wherein the third guide means are positioned to guide the mesh along a vertical path from the second guide means.

4. Apparatus as claimed in claim 3, further comprising means for varying the height of the third guide means.

5. Apparatus as claimed in claim 4, wherein the second guide means comprise a graphite roller.

6. Apparatus as claimed in claim 5, wherein the first and third guide means comprise resiliently mounted rollers.

* * * * *